United States Patent [19]
Clagett et al.

[11] 3,785,228
[45] Jan. 15, 1974

[54] FRONT RELEASABLE, LATERALLY CLAMPING, QUICK-CHANGE TOOL HOLDER FOR AN ORBITING CRANKSHAFT LATHE GIRT

[75] Inventors: Thomas E. Clagett; Martin W. Dahl, both of Saginaw, Mich.

[73] Assignee: The Wickes Corporation, Saginaw, Mich.

[22] Filed: May 22, 1972

[21] Appl. No.: 255,444

[52] U.S. Cl. .............................. 82/36 B, 29/97, 82/9
[51] Int. Cl. ....... B23b 29/00, B23b 5/18, B26d 1/00
[58] Field of Search ................... 82/36, 36 A, 36 B, 82/35, 37, 9; 29/97

[56] References Cited
UNITED STATES PATENTS
1,959,140  5/1934  Peterson ........................... 82/35 R
2,154,739  4/1939  Floeter .............................. 82/9 R X
1,919,738  7/1933  Melling ................................. 29/97

*Primary Examiner*—Harrison L. Hinson
*Attorney*—Learman & McCulloch

[57] ABSTRACT

A tool holder and girt assembly wherein a tool holder is mounted for fore and aft movement perpendicular to the crankshaft axis of rotation on a girt way. It is secured in position by a laterally movable clamp member which anchors the tool holder in machining position on the girt support. The lateral clamping force is created by an accentric part, provided on a front to rear extending rotatable clamp actuator, which is manipulatable from the front of the tool holder.

17 Claims, 4 Drawing Figures

PATENTED JAN 15 1974 3,785,228

FRONT RELEASABLE, LATERALLY CLAMPING, QUICK-CHANGE TOOL HOLDER FOR AN ORBITING CRANKSHAFT LATHE GIRT

BACKGROUND OF THE INVENTION

In orbiting crankshaft lathes of the character to which this invention relates, it is the practice, when tool bits are to be replaced and reground or discarded, to remove the entire tool holder and transfer it to a bench to facilitate the exact realignment of the cutting edges of the multiple tools which are employed. The tool holders, when mounted in position on orbiting girts provided on the lathe, are necessarily positioned closely to spacer plates on either side of each girt which guide the girts in their orbiting path of travel. This, particularly on lathes for machining the smaller crankshafts, has restricted access to the sides of the tool holders and, since such tool holders have been adjusted to precise lateral positions by set screws located in the sides of the tool holder, it has been difficult to reposition tool holders which have been removed and are to be restored to position. The replacement operation has been time-consuming and, as a result, the machines have had more "down" time than is desirable. This has been a particular problem when "cheeking" cuts are being taken and the tool bits require frequent replacement.

One of the prime objects of the present invention is to design a tool holder which mounts on a laterally adjusted way and can always be precisely returned to the same position. Thus, one tool holder may be removed for the purpose of changing its tool bits, and another substituted for it, without any need for realignment of the replacement tool holder.

A further object of the invention is to provide a front releasable tool holder which permits lateral clamping of the tool holder to a fore and aft way provided on the girt support, without any need for access to the sides of the girt to release the tool holder.

Another object of the invention is to design an assembly of this character which minimizes human error in the sense that returning a tool holder to position is a relatively easy task for inexperienced machinists, and it is relatively difficult to return it to incorrect position.

Still another object of the invention is to provide an assembly of the character described which is economical to manufacture and assemble, and highly reliable in operation.

Other objects and advantages of the invention will be pointed out specifically or will become apparent from the following description when it is considered in conjunction with the appended claims and the accompanying drawings, in which:

Referring now more particularly to the accompanying drawings, the girt, shown at 10, is provided for mounting a tool holder, generally designated H, for machining one of the orbiting crank pins 11 of a multiple throw crankshaft to be machined. It is to be understood that the girt 10 is only one of a series of transversely spaced girts which are also being orbited in correlation with the orbit of like crank pins on master crankshafts on a crankshaft lathe. For example, a typical crankshaft being machined may have six throws and heavy crankshafts may weigh in the neighborhood of several hundred pounds. When such crankshafts are being machined, heavy reactive forces or thrusts are generated and the tool mount assembly must be extremely rigid and stable, and capable of absorbing the heavy counter forces. The tool holders must be so mounted in position that they do not move under machining pressures. Machines of the character with which the present assembly is used are illustrated in U.S. Pat. Nos. 1,919,738 and 2,421,147, for instance, and in the present assignee's co-pending patent application, filed concurrently herewith, which is incorporated herein by reference.

Figure 2:
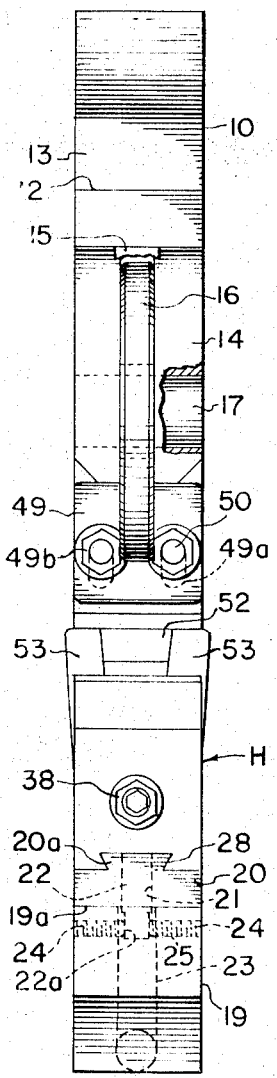
FIG. 2 is a front elevational view thereof.
Figure 1:
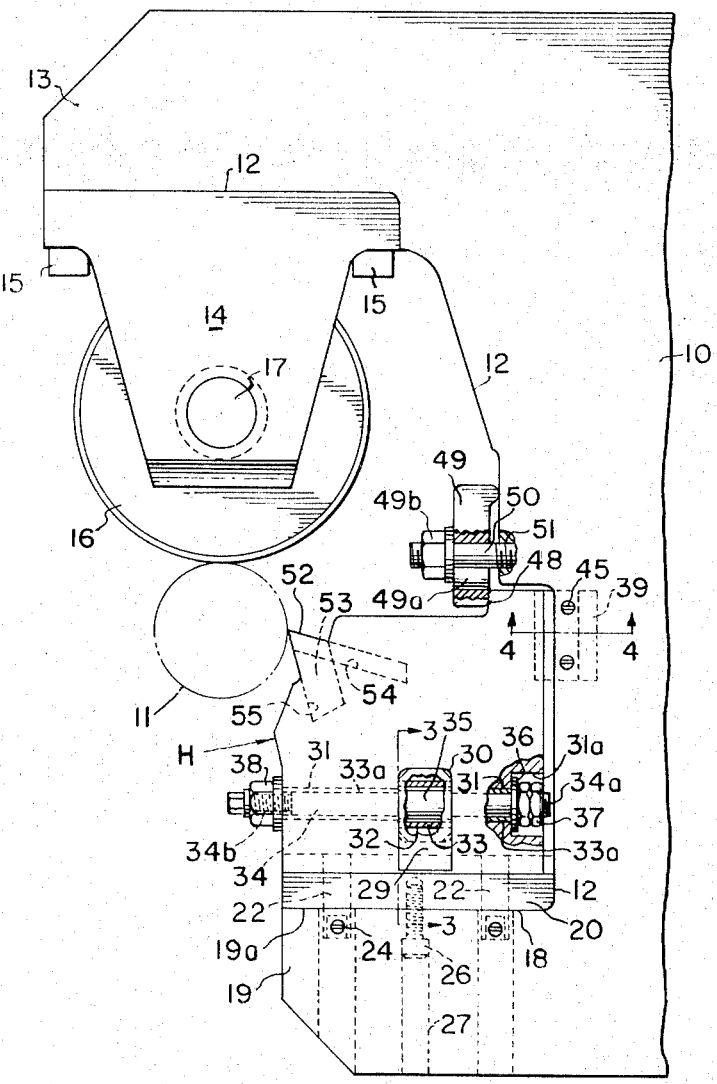
FIG. 1 is a side elevational view of the assembly, parts being broken away to particularly illustrate the manner in which the tool holder is clamped in position. An orbiting crank pin of the crankshaft being machined is shown schematically.

As FIG. 1 illustrates, each girt 10 is recessed at its front end as at 12, and includes an overhanging upper arm portion 13 for mounting a roller holder 14 which may be bolted in position as at 15. The roller 16, which is carried by the support 14, is mounted on a roller pin 17 in the usual manner. At its lower end, the front end of the girt 10 is recessed as at 18 to provide a tool holder support portion 19. Mounted on the platform surface 19a of support portion 19, is a way part 20 having a plurality of vertical openings 21 in its dovetail-shaped way portion 20a to receive dowel pins 22 which extend down into relatively diametrally enlarged vertical openings 23 provided in the tool holder support portion 19. Manipulatable set screws 24 provided in laterally extending opposed threaded side openings 25 in the girt support 19, engage the flatted lower portion 22a of each of the dowel pins 22 to facilitate accurate lateral location of the way part 20. Clamping of the way part 20 to the tool holder support 19 is effected by bolt members 26 received in openings 27, provided in the support part portion 19.

Figure 3:
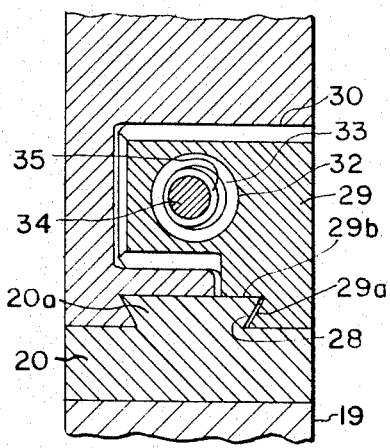
FIG. 3 is an enlarged, transverse sectional view taken on the line 3—3 of FIG. 1.

The tool holder H, at its lower end, is recessed to provide way-engaging surfaces which are configured to dovetail to the way part 20a on the way block 20, as at 28. Shown in FIG. 3 is a clamp plate member 29 adapted to be received in a recess 30, provided about mid-way on one side of the tool holder H. The clamp member 29 includes a tapering surface 29a and an upper surface 29b which mate with the like surfaces of way 20a. The clamp plate 29 is shown in unclamped position in FIG. 3, and is moved to clamped position in a manner which will now be described.

Provided in the tool holder H and clamp member 29 are aligned front to rear openings 31 and 32, respectively. A hardened liner or bushing 33 is provided in the opening 32 in the clamp member 29 and liner or sleeve parts 33a are also provided in opening 31. Provided to extend through the liner parts 33a and through the liner 33, is a rotatable actuator stud or shaft 34, which includes an eccentric portion 35 situated within slightly larger diameter liner 33. The eccentricity, for example, may be of the nature of about one-sixteenth inch and portion 35 is integrally provided on the shaft 34. At its opposite ends, the shaft 34 is threaded as at 34a and 34b, and it will be noted that the inner threaded end 34a is received within an enlarged portion 31a of opening 31. A washer 36 and jam nuts 37 are provided on the end 34a of the actuator member 34. At its front end a lock nut 38 is provided on the threaded portion 34b which can be turned down to lock the rotatable actuator member 34 in a particular position of rotary or angular adjustment.

Figure 4:
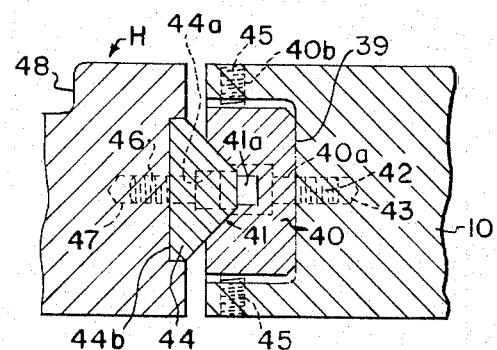
FIG. 4 is an enlarged, sectional, inverse plan view taken on the line 4—4 of FIG. 1.

At the rear upper portion of its tool holder receiving recess 18, each girt 10 is further inwardly recessed as at 39 (see FIG. 4) to receive a locating block 40 having a V-shaped vertically extending locating opening 41 in its front surface. The block 40 is bored and counterbored to provide an opening 40a for a bolt 42 which extends into a threaded opening 43, provided in the girt 10. Opposed threaded openings 40b, provided in the sides of girt 10 opposite block 40 accommodate set screws 45 which are provided to facilitate laterally locating the block 40 in position. Mounted on the inner face of the tool holder H, in a recess 44b provided for that purpose, is a V-shaped mating locator part 44 which is received by the ways 41 (which may be relieved as at 41a). The locator 44 is bored and counterbored as at 44a to receive screws 46 which extend into threaded openings 47 provided in the tool holder H and secure the locator 44 in position thereon. Provided outwardly of the locator member 44 on the tool holder H is a shoulder surface 48 which is engaged by a clamp plate 49, secured in position by bolt members 50 which extend through vertically enlarged openings 49a in the clamp plate 49 and into threaded openings 51 provided in the girt 10.

In operation, to properly mount the tool holder H, which comes with its multiple tool bits 52 and 53 already preset in position in openings 54 and 55 respectively, is a relatively simple matter. With the set screws 45 and 24 backed off, and the bolts 26 and 42 also backed off, the tool holder H is moved forwardly on way 20a until the V-shaped locator part 44 is fully engaged in locator surface 41. These latter surfaces provide a stop or inner location for the tool holder H. To clamp the holder in place on way part 20, the rotatable actuator member 34 is turned to move the eccentric 35 to the left in FIG. 3, and force the clamp member 29 inwardly to engage the surface 29a with the way 20a after which nut 38 is tightened down to lock the actuator member 34 securely in position.

At this time, the clamp plate 49 is only lightly secured in position in a manner which does not prevent lateral adjustment of the tool holder via manipulating set screws 24 and 45, after which clamp bolts 26 and 42 are secured in position or tightened down. Finally, nuts 49b are tightened down.

When the tool bits 52 and 53 have been sufficiently worn that regrinding is necessary, it is a simple matter to loosen nut 38 and rotate actuator 34 to dispose the eccentric portion 35 again in the position in which it is shown in FIG. 3, and to loosen nuts 49b so that clamp plate 49 may be moved upwardly. The tool holder H to be replaced can then be slid off the way part 20, and a new tool holder immediately reinserted in the manner indicated, without any need for lateral adjustment of the parts before the machining operation can proceed.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

We claim:

1. A tool holder and girt assembly comprising:
   an orbitable girt providing a support platform on which a tool holder may be mounted;
   said platform having a front to rear extending way thereon;
   a tool holder with a tool bit at one end having a mating way part, received by said way, which is partly recessed at one side to expose one side portion of said way;
   a laterally movable clamp having a way clamping portion shaped to said way;
   front to rear extending actuator means manipulatable from the tool bit end of the holder, carried by said holder; and
   means connected with said actuator means for exerting a force urging said clamp and way part laterally inwardly to clamp the holder to the way.

2. The combination defined in claim 1 in which said way is mounted on said platform in a manner to permit its lateral adjustment thereon; and releasable means is provided for securing the way in position once lateral adjustment has been effected.

3. The combination defined in claim 1 in which vertical openings are provided in said platform and dowel pins of reduced diameter relative to said openings extend from said way into said openings.

4. The combination defined in claim 3 in which opposed laterally adjustable means are provided in communication with said openings for positioning said dowel pins, and thereby said way.

5. The combination defined in claim 2 in which a locator member is provided on said girt at a spaced distance above said way for receiving the opposite end of said tool holder;
   means is provided for laterally adjusting said locator member; and
   releasable means is provided for securing the locator member in position once lateral adjustment has been completed.

6. The combination defined in claim 5 in which clamp means mounted on said girt above said locator member is releasably provided for clamping the upper front end portion of said tool holder to said girt.

7. The combination defined in claim 1 in which said way includes a dovetail portion; said tool holder is cut away in one section thereof to engage only one side portion of said dovetail portion and expose an opposite side portion; and said clamp has a portion shaped for receiving and clamping the opposed exposed side portion thereof.

8. The combination defined in claim 7 in which said tool holder is recessed intermediate its ends to receive said clamp.

9. The combination defined in claim 1 in which said actuator means is rotatably carried by said tool holder and releasable means is provided for releasably fixing said actuator means to said tool holder.

10. The combination defined in claim 9 in which said actuator means comprises a stud carried by the tool holder in bushing means, which have an internal diameter substantially the diameter of said stud; and an enlarged opening relative to said stud is provided in said clamp, through which said stud extends.

11. The combination of claim 10 in which said means connected with said actuator means for exerting the force comprises an eccentric part on said stud situated in said enlarged opening for camming the clamp laterally inwardly toward said way.

12. The combination of claim 11 in which said releasable means for releasably fixing said actuator means comprises nut means; said stud being threaded at its front end to receive said nut means.

13. The combination of claim 5 in which said girt is recessed interjacent its sides to receive said locator member; said locator member comprising a block which is laterally adjustable in the recess which receives it; and a mating block is provided on said tool holder to be received by said locator block.

14. In combination with an orbital crankshaft lathe having axially aligned head and tail stock spindles for rotating a crankshaft to be machined about a lateral axis of rotation, a tool holder and girt assembly for machining a crankshaft mounted on said spindle comprising:
- a front removable tool holder carrying tool bit means at its front end;
- a girt providing a front to rear extending platform on which said tool holder may be supported, said platform providing a front to rear extending way section thereon extending transversely to said axis;
- means mounting said girt for orbital movement in a vertical plane transverse to said axis;
- a tool holder guide section mating with said way section received by said way section for releasably locating said tool holder on said girt;
- means adjustable to laterally move said sections relatively with said girt in an axial direction and to fix said tool holder in an adjusted position on said girt;
- a part having a vertically extending projection of generally V-section and a part having a vertically extending V-shaped mating recess shaped to receive said projection, provided on said girt and tool holder; and
- means adjustable to laterally move said parts relatively with said girt in an axial direction and to fix said parts and thereby also position said tool holder in said axially adjusted position relative to said girt.

15. The combination defined in claim 14 in which a releasable front to rear extending clamp bolt accessible at the tool bit carrying end of said tool holder for tool holder release purposes is carried by said tool holder for releasably clamping the latter in position on said girt.

16. In combination with a crankshaft lathe having axially aligned head and tail stock spindles for rotating a crankshaft to be machined about an axis of rotation, a tool holder and girt assembly for machining a crankshaft mounted on said spindle comprising:
- a front removable tool holder carrying tool bit means at its front end;
- a girt providing a platform on which said tool holder may be supported, said platform providing a front to rear extending way section thereon transverse to said axis;
- means mounting said girt for orbital movement in a vertical plane transverse to said axis;
- a tool holder guide section mating with said way section received by said way section for releasably locating said tool holder on said girt;
- means adjustable to laterally move said sections relatively with said girt in an axial direction and to fix said tool holder in an adjusted position on said girt; and
- a releasable front to rear extending clamp bolt accessible at the tool bit carrying end of said tool holder for releasably clamping the way section and guide section.

17. In combination with a crankshaft lathe having axially aligned head and tail stock spindles for rotating a crankshaft to be machined about an axis of rotation, a tool holder and girt assembly for machining a crankshaft mounted on said spindle comprising:
- a front removable tool holder carrying tool bit means at its front end;
- a girt providing a platform on which said tool holder may be supported, said platform providing a front to rear extending way section thereon extending transversely to said axis;
- means mounting said girt for orbital movement in a vertical plane transverse to said axis;
- a tool holder guide section mating with said way section received aboard said way section for releasably locating said tool holder on said girt and rigidly holding the bottom of said tool holder to said platform;
- means adjustable to laterally move said sections relatively with said girt in an axial direction and to fix said tool holder in an adjusted position on said girt;
- a part having a projection and a part having a mating recess shaped to receive said projection provided on said girt and tool holder at the rear end of said tool holder;
- means adjustable to laterally move said parts relatively with said girt in an axial direction and to fix said parts and thereby said tool holder in an axially adjusted position relative to said part; and
- a releasable clamp plate and clamp bolt assembly wherein said bolt extends through said clamp plate into said girt, spanning and bearing against said holder and girt for clamping the upper rear end of the holder to the girt.

* * * * *